United States Patent
Norman et al.

(10) Patent No.: US 9,369,931 B2
(45) Date of Patent: Jun. 14, 2016

(54) METHOD AND RADIO ACCESS NODE FOR INCORPORATING A MOVING CELL IN A WIRELESS COMMUNICATION NETWORK

(75) Inventors: Marten Norman, Spanga (SE); Jacob Osterling, Jarfalla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/412,507

(22) PCT Filed: Jul. 2, 2012

(86) PCT No.: PCT/SE2012/050753
§ 371 (c)(1),
(2), (4) Date: Jan. 2, 2015

(87) PCT Pub. No.: WO2014/007687
PCT Pub. Date: Jan. 9, 2014

(65) Prior Publication Data
US 2015/0163711 A1    Jun. 11, 2015

(51) Int. Cl.
*H04W 36/00* (2009.01)
*H04W 24/02* (2009.01)
(Continued)

(52) U.S. Cl.
CPC .......... *H04W 36/0083* (2013.01); *H04W 24/02* (2013.01); *H04W 84/005* (2013.01); *H04W 48/12* (2013.01)

(58) Field of Classification Search
CPC .... H04W 84/045; H04W 48/08; H04W 36/00
See application file for complete search history.

(56) References Cited

U.S. PATENT DOCUMENTS

| | | | | |
|---|---|---|---|---|
| 6,345,186 B1 * | 2/2002 | Schultz | ................. | H04W 36/24 455/436 |
| 6,930,986 B2 * | 8/2005 | Dempo | ............. | H04W 36/0055 370/310.2 |
| 8,374,629 B2 * | 2/2013 | Yin | ......................... | H04W 8/02 455/435.1 |

(Continued)

FOREIGN PATENT DOCUMENTS

| | | |
|---|---|---|
| EP | 1933583 | 6/2008 |
| WO | WO-2009/124083 | 10/2009 |

(Continued)

OTHER PUBLICATIONS

PCT International Search Report for Counterpart PCT Application No. PCT/SE2012/050753, (Jun. 20, 2013), 5 pages.
(Continued)

*Primary Examiner* — Mahendra Patel
(74) *Attorney, Agent, or Firm* — Patent Portfolio Builders, PLLC (57) ABSTRACT

A method for incorporating a moving cell in a hierarchy of cells in a wireless cellular communication network, wherein each cell is associated with a neighbor cell list comprising identification of one or more neighboring cells. The method includes determining a need for an update of one or more neighbor cell lists following relocation of the moving cell from a first location having a first set of neighboring cells to a second location having a second set of neighboring cells. A neighbor cell list is generated for the moving cell including identification of each cell in the second set of neighboring cells. The neighbor cell list is updated for each cell in the second set of neighboring cells to include the moving cell. Each radio access node serving one or more cells in the second set of neighboring cells are informed on the updated neighbor cell list.

10 Claims, 7 Drawing Sheets

(51) Int. Cl.
  *H04W 84/00* (2009.01)
  *H04W 48/12* (2009.01)

(56) References Cited

U.S. PATENT DOCUMENTS

| | | | | |
|---|---|---|---|---|
| 2003/0235165 | A1* | 12/2003 | Wang | H04W 36/12 370/331 |
| 2005/0148368 | A1* | 7/2005 | Scheinert | H04W 24/02 455/561 |
| 2006/0009235 | A1* | 1/2006 | Sheynblat | G01S 5/0036 455/456.1 |
| 2006/0019600 | A1* | 1/2006 | Lin | H04W 88/08 455/3.02 |
| 2007/0105585 | A1 | 5/2007 | Lee et al. | |
| 2008/0146237 | A1* | 6/2008 | Shikama | H04W 36/32 455/438 |
| 2009/0047955 | A1* | 2/2009 | Frenger | H04J 11/0093 455/436 |
| 2009/0303891 | A1* | 12/2009 | Lucas | H04W 36/0083 370/252 |

FOREIGN PATENT DOCUMENTS

| | | |
|---|---|---|
| WO | WO-2009/142054 | 11/2009 |
| WO | WO-2011/027028 | 3/2011 |

OTHER PUBLICATIONS

PCT Written Opinion for Counterpart PCT Application No. PCT/SE2012/050753, (Jun. 20, 2013), 8 pages.

* cited by examiner

Prior Art

Prior Art

METHOD AND RADIO ACCESS NODE FOR INCORPORATING A MOVING CELL IN A WIRELESS COMMUNICATION NETWORK

CROSS-REFERENCE TO RELATED APPLICATIONS

This application is a National stage of International Application No. PCT/SE2012/050753, filed Jul. 2, 2012, which is hereby incorporated by reference.

TECHNICAL FIELD

The present invention relates to a method for incorporating a moving cell in a hierarchy of cells in a wireless cellular communication network each cell is associated with a neighbor cell list comprising identification of one or more neighboring cells. The invention also relates to a radio access node contributing to the performance of such a method.

BACKGROUND

In a typical cellular radio system, wireless terminals communicate via a radio access network, RAN, to one or more core networks. The wireless terminals can be mobile stations or user equipment, UE, such as portable, pocket, hand-held, computer-included, or car-mounted mobile devices which communicate voice and/or data with radio access network, e.g., mobile telephones and laptops with wireless capability.

The RAN covers a geographical area which is divided into cell areas, with each cell area or group of cell areas being served by a radio access node. A cell is a geographical area where radio coverage is provided by equipment at the radio access node. Each cell is identified by an identity within the local radio area. The radio access nodes communicate over the air interface with UEs within the cells served by the node.

In order to maintain a radio connection with the network, the user equipments are handed over from one cell to the next when travelling through the geographical area. To facilitate handovers in cellular systems, a neighbor cell list is used. The neighbor cell list is stored in a neighbor cell list database holding records for each cell in the system. Each record is associated to a cell by a cell identity. Each neighbor cell list contains a set of cells that user equipments within the current cell may be in the range of from a handover perspective. A typical implementation has one master database while other entities, e. g., a radio base station in a radio access node and the user equipment maintains a copy of the relevant records for their context.

A purpose of neighbor cell lists is to provide connecting user equipment with a short list of alternative cells that may provide better signal or performance than the current cell. A typical use is to prepare for handover, when the user equipment moves over a geographical area larger than that the coverage area of a single cell. By limiting the number of cells in the neighbor cell list, the user equipment measurement and processing task may be simplified. The neighbor cell list may also include a set of rules for neighbor cell relations that govern the handovers, for example thresholds, restrictions or timers. Thus, the existence and correctness of the neighbor cell list is essential for a satisfying performance at handover in a cellular radio system.

The handover process involves measurements of performance, e.g., signal strength measurements, for both the serving cell that the UE is connected to and for one or more neighbor cell(s). In the handover decision, it is determined that the UE should add a neighbor cell as serving cell and may disconnect from the current serving cell. A typical handover takes place in the overlapping area between two cells when a mobile is moving from a first to a second cell.

Defining neighboring cells in a proper way may be problematic, in particular when one or more neighboring cells may be moving or nomadic cells. Since the cellular radio networks are constantly growing, moving cells is an ever ongoing process; not only adding new cells to existing neighbor cell lists, but also removing cells that are no longer relevant. In prior art solutions, adding new relations can be a rather slow process, where the system needs to judge additions and removal of cell relations over long periods of time before making a decision.

When a new cell is introduced in a wireless network, it may cause significant effects on the surrounding cells' performance if not all necessary network configuration changes are made at the same time.

Such simultaneousness requires operator planning. Poorly maintained neighbor cell lists affect performance in cellular networks.

Current cellular systems and standards can support nomadic and moving radio base stations, cells that move around between different locations. Typical examples are airplanes and ships, where an onboard radio access node, i.e., a radio base station, provides local coverage onboard. Connection to "the rest of the world" is achieved by satellite and microwave links. Current state of the art depends on separating the moving cell(s) from the fixed cells in the surrounding cellular systems. This is performed by a combination of separated networks, requiring subscribers to enter the cells as roamers and physical shielding to avoid overlap with surrounding cells. Thus, the moving cell is basically isolated from the surroundings and handover between the moving cell and neighboring cells is not contemplated.

However, there is an increasing need to allow moving/nomadic cells as true parts of the cellular network.

SUMMARY

It is an object of the invention to provide solutions for incorporating a moving cell into a wireless cellular network in real time without manual or other type of prior pre-configuration. Such an object is achieved in embodiments of a method for incorporating a moving cell in a hierarchy of cells and in embodiments of a radio access node for contributing to the method.

In an embodiment of a method for incorporating a moving cell in a hierarchy of cells in a wireless cellular communication network each cell is associated with a neighbor cell list comprising identification of one or more neighboring cells. The method includes a step of determining a need for an update of one or more neighbor cell lists following relocation of the moving cell from a first location having a first set of neighboring cells to a second location having a second set of neighboring cells. A neighbor cell list is generated for the moving cell including identification of each cell in the second set of neighboring cells. The neighbor cell list is updated for each cell in the second set of neighboring cells to include the moving cell. In a concluding step, each radio access node serving one or more cells in the second set of neighboring cells are informed on the updated neighbor cell list.

In an embodiment of a radio access node for contributing in the execution of the method embodiments, a measurement unit is configured to perform neighboring cell measurements in the radio access node. A memory in the radio access node includes a neighbor cell list. The radio access node further comprises a processor configured to process the neighboring cell measurements, to identify one or more neighboring cell and to update the neighbor cell list in the memory. A communication unit in the radio access node is configured to send the neighbor cell list to a server including neighbor cell lists for each cell in the wireless communications network. The radio access node also includes a positioning unit configured to determine a geographic position of the radio access node.

DETAILED DESCRIPTION OF THE DRAWINGS

Figure 1:
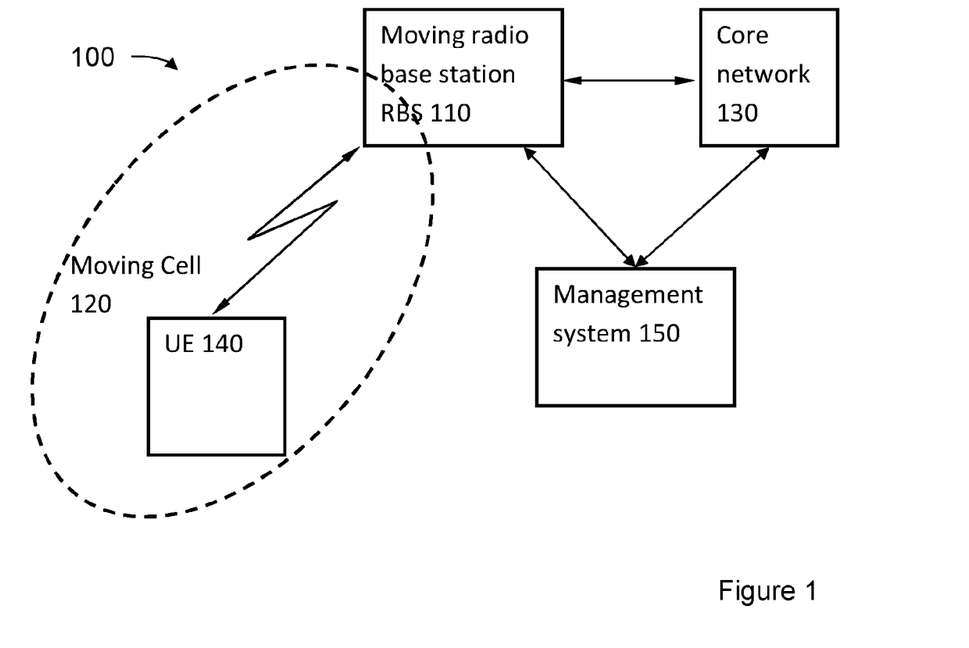
FIG. 1 Schematic illustration of a moving cell with associated RBS
FIG. 2 Flow chart of a prior art method for identifying a change of cells
FIG. 3 Schematic illustration of a cellular radio network
FIG. 4 Flow chart of an embodiment of the invention
FIG. 5
  a. State of the art cell pattern
  b. Schematic illustration of cell pattern with two moving cells
  c. Schematic illustration of the moving cell according to FIG. 5b
FIG. 6 Schematic illustration of an embodiment of a radio access node
FIG. 7 Schematic illustration of a data link from a moving cell to a core network.

FIG. 1 discloses a schematic view of an exemplary moving cell 120 with an associated radio access node illustrated as a radio base station, RBS 110 in a cellular network 100 wherein the invention may be implemented. is In the following the term radio access node may be used when describing a radio base station or any other type of node configured as a node connecting to a user equipment UE, over an air interface. The invention is not limited to any specific type of radio base station or radio access nodes, and, unless specifically so stated, any exemplary embodiments discussing a radio base station, RBS, or base station in general will be applicable to any nodes in a radio access network described as radio access nodes. The cellular network may be an LTE, WCDMA, GSM/GPRS, Wimax or any other similar wireless communications network. A user equipment, UE 140, in the moving cell 120 communicates with a core network 130 by means of the moving radio base station, RBS 110. The core network 130 includes control functions for the cellular network and connectivity to other networks like the public switched telephone network and internet. The RBS 110 provides coverage in the moving cell 120 area. Other moving cells may also be associated with the RBS 110 so that the RBS provides coverage in a plurality of adjacent or at least partly overlapping cell areas. The UE 140 is capable of connecting to the moving cell 120, whereby a connection is set up to the core network 130 over the RBS 110. A management system 150 provides supporting processes for network management to the moving RBS 110 and core network 130.

Figure 2:
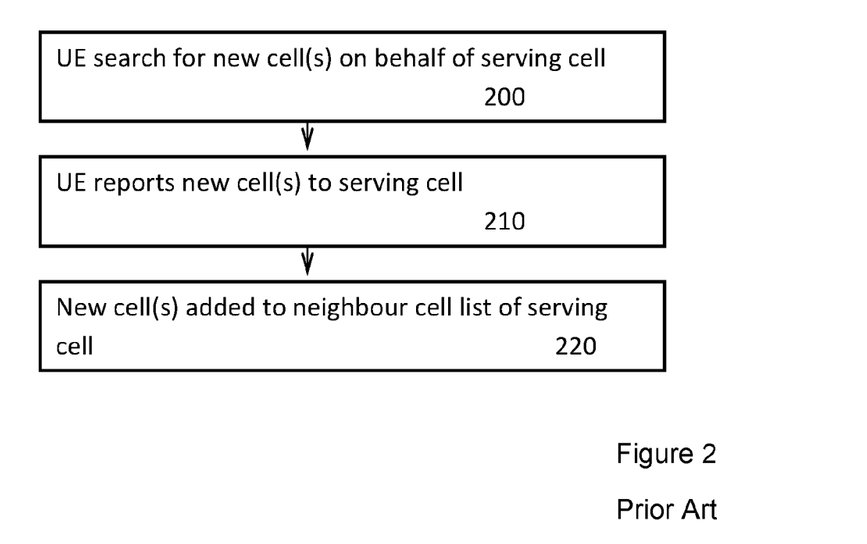

FIG. 2 shows a flow chart for a prior art method for identifying a change of neighboring cells in a moving radio access node. The method is performed by a user equipment, UE 140 on behalf of a serving cell 120. The method detects fairly slow changes and is intended to be run by several UEs 140 in order to both collect information from all parts of the cell and to statistically verify that a neighbor is in range.

In a first step 200, the user equipment UE performs a search for new cell(s) in the same cellular network and may also search for new cells in cooperating cellular networks. In a consecutive step 210, the UE reports the new cell(s) to the serving cell, i.e. to a serving radio access node. In a concluding step 220, a neighbor cell list is updated to include new cell(s) by adding them to a record associated with the serving cell. The result of the disclosed method is that the network receives knowledge of the new cell(s) and neighboring relations so that these cells may be considered as candidates for handover of an UE 140 located in the serving cell.

Figure 3:
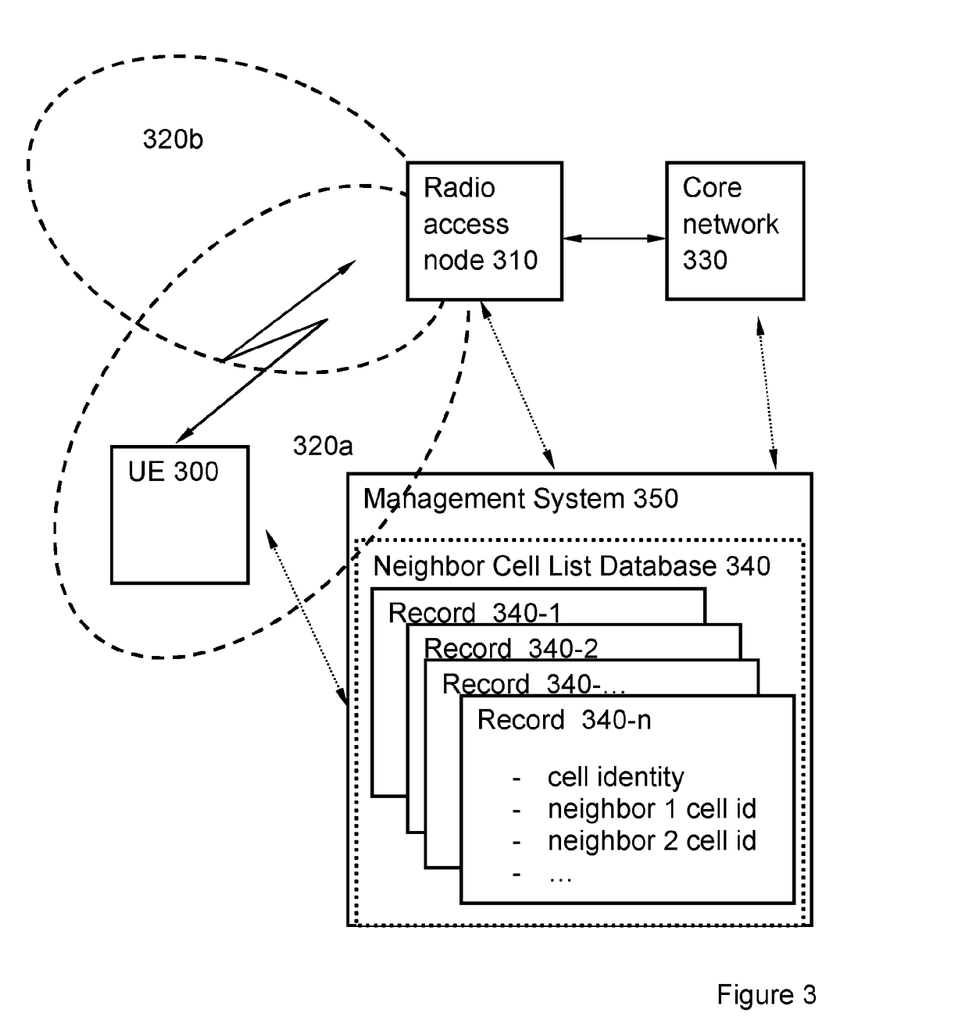

FIG. 3 discloses a wireless communication network wherein the invention may be implemented. The illustrated network includes two cells 320a,b associated with a radio access node 310. A management system 350 includes a neighbor cell list database 340 represented as a set of records 340-1, . . . 340-n. The neighbor cell list 340 may be implemented as a database on a physical server or in a virtual server in a management system 350. The neighbor cell list may also be included in one of or distributed between the UE 300, RBS 310 and Core network 330. A typical implementation has one master database, while other stakeholders, e.g. the RBS and UE keep a copy of the relevant records for their context.

Figure 4:
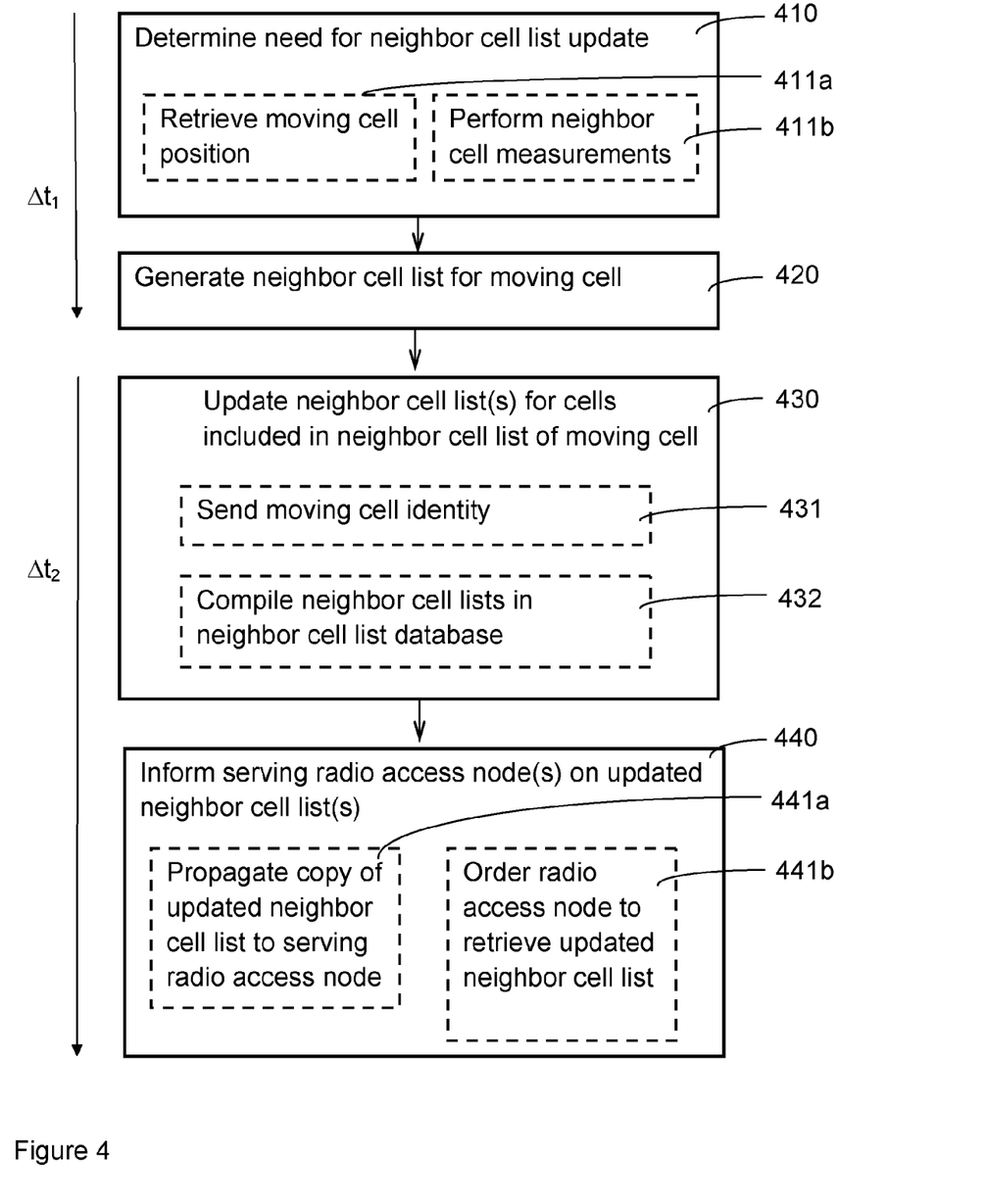

FIG. 4 discloses an embodiment of a method for incorporating a moving cell in a hierarchy of cells in a wireless cellular communication network, such as the network disclosed for FIG. 1 or 3. Each cell in the network is associated with a neighbor cell list comprising identification of one or more neighboring cells. The embodiment of the method is initiated upon determination of a need for an update of one or more neighbor cell lists following relocation of the moving cell from a first location having a first set of neighboring cells to a second location having a second set of neighboring cells. Such determination may include a step 411a retrieving position information from a global positioning system, e.g. the GPS, Galileo, GLONASS or BEIDOU system and comparing the position with information in a map database including the location of all cells in the wireless network. It may also include using the known concept of cell positioning, i.e. receive the identity of surrounding cells, find their position in a data base and calculate the relative position. It may also include round-trip delay measurement to find the distance to neighbor cells according to methods known by those skilled in the art. A radio access node associated with the cell, may include a user equipment or include hardware/software to emulate relevant user equipment functions that can be used in a step 411b to perform measurements, e.g, signal strength measurements, and/or search for cells in range of the UE in accordance with state of the art solutions. Other ways of determining a need for neighbor cell list update, includes the radio access node communicating the act of moving from a first location to a second location, and determining the new position from measurements to known geostationary positions. The step of determining 410 a need for neighbor cell list update may be triggered by receipt of information indicating that the radio access node is moving.

A neighbor cell list is generated for the moving cell in step 420. The neighbor cell list may be generated in conventional manner with user equipment performing measurements, e.g. signal strength measurements, to search for cells in range, e.g. using data collected in step 411b. The neighbor cell list may also be generated based on the position information acquired as described above. Information on a new position may be compared with information stored in a database on all cells neighboring a specified location in the location database. The steps of concluding the need for a neighbor cell list for a moving cell and thereafter generating this list, is to be performed in real time within a time-frame $\Delta t_1$, initiated at the point in time when information is received indicating the need for such an amended neighbor cell list.

In step 430, the information in the neighbor cell list for the moving cell is used to update neighbor cell lists for the cells included in the updated neighbor cell list of the moving cell. In an embodiment of the invention, the update is performed for all cells listed as neighboring cells in the list for the moving cell. However, updating may also be performed for a subset of cells in the list based on an estimated likelihood for handover. The updating of neighbor cell list may be performed by the radio access node associated with the moving cell, wherein the moving radio access node uses the information in the neighbor cell list to be able to contact all the radio access nodes of all neighboring cell included in the neighboring cell list. Said contact may be indirect, by means of an entity in or connected to the core network 330, e.g the neighbor cell list database 340 or directly, where the radio access node may include or emulate a user equipment or any other type of device capable of communicating with radio access nodes by the radio interface. The updates of data to neighboring radio access nodes may be sent by SMS or on a data connection to the server holding the list. The update may also be performed by the radio access node including a user equipment capable of reporting the radio access node as a neighbor to be added immediately to the neighboring cell list in the receiving radio access node. In an embodiment of the invention, the update is performed by sending data via the normal core net connection to the entity carrying the database with the set of neighbor cell lists. In an optional embodiment of the invention, the step of updating the neighbor cell lists in neighboring cells includes sending the identity of the moving cell in step 431 to the neighboring cells, e.g. by an SMS as previously stated. In a further optional step 432 of the disclosed embodiment of the invention, the updated neighbor cell lists in the radio access nodes of the neighboring cells, are compiled in a neighbor cell list database. The database may be a conventional database in the core network or any type of distributed or cloud database.

In step 440, information on the updated neighbor cell list is distributed to each serving radio access node affected by the update. Information to the serving radio access node(s) may be propagated from a server in a management system 350 holding the database containing updated neighbor cell lists, whereby a copy of the updated neighbor cell list is sent to the respective serving radio access node in step 441a. In an alternative embodiment, an order is sent in step 441b to a serving radio access node that updated neighbor cell information is available in the database containing the updated neighbor cell lists. The serving radio access node receiving the order is expected to proceed with downloading a copy of the updated neighbor cell list from the central database storing the set of updated neighbor cell lists. The step of updating the information in the neighbor cell lists for a set of cells neighboring the moving cell, and transferring this information to the neighboring cells concerned by this change of neighbor cell lists, is performed in real-time within a second time-frame $\Delta t_2$ that makes the change(s) effective in the network. The real-time properties of $\Delta t_1$ and $\Delta t_2$ should be dimensioned to be fast enough for making the change effective while the moving cell is in range to receive handovers from and make handovers to the involved neighbor cells. For a fast-moving cell this may involve prediction of future positions, e.g from a known route for the moving cell following from a travel plan/schedule for a vehicle including the moving cell. The step 410 of determining the need for a neighbor cell list update may then be performed at least partly on predicted values, e.g. estimated from historical, calculated or defaulted numbers, in order to be able to perform step 440 in time for the moving cell arriving to its new position.

Figure 5A:
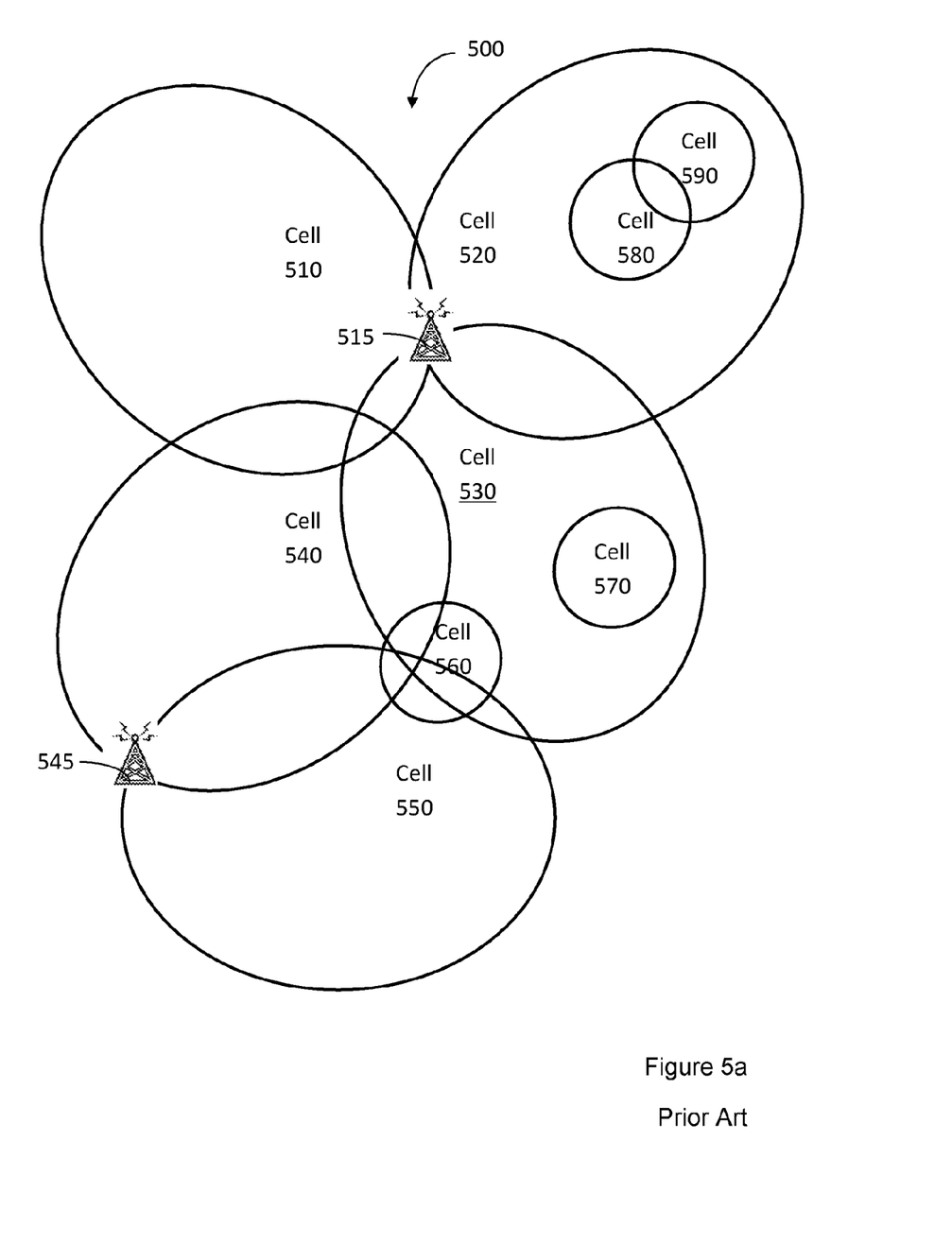

FIG. 5a discloses a state of the art cellular network 500. A geographic area is covered by a number of overlapping macro cells 510-550. A first set of cells 510, 520 and 530 belong to a radio access node 515, configured as a typical 3 sector radio base station. Cells 540 and 550 are served by radio access node 545. A number of smaller cells add capacity and or/performance in parts of the cell pattern. Cell 560 overlaps with a portion of the cell intersection of cells 530, 540 and 550 and is configured to be a hotspot or filler cell improving performance on the edge of the cells 530-550. The smaller cell 570 may represent a shopping center, requiring additional traffic capacity during opening hours. The cell may also represent an area exposed to radio shading so that additional coverage fill in an area specifically exposed to fading. Cells 580 and 590 are similar to cell 570, but shows that there may be overlap and hence handovers between the small cells as well.

Figure 5B:
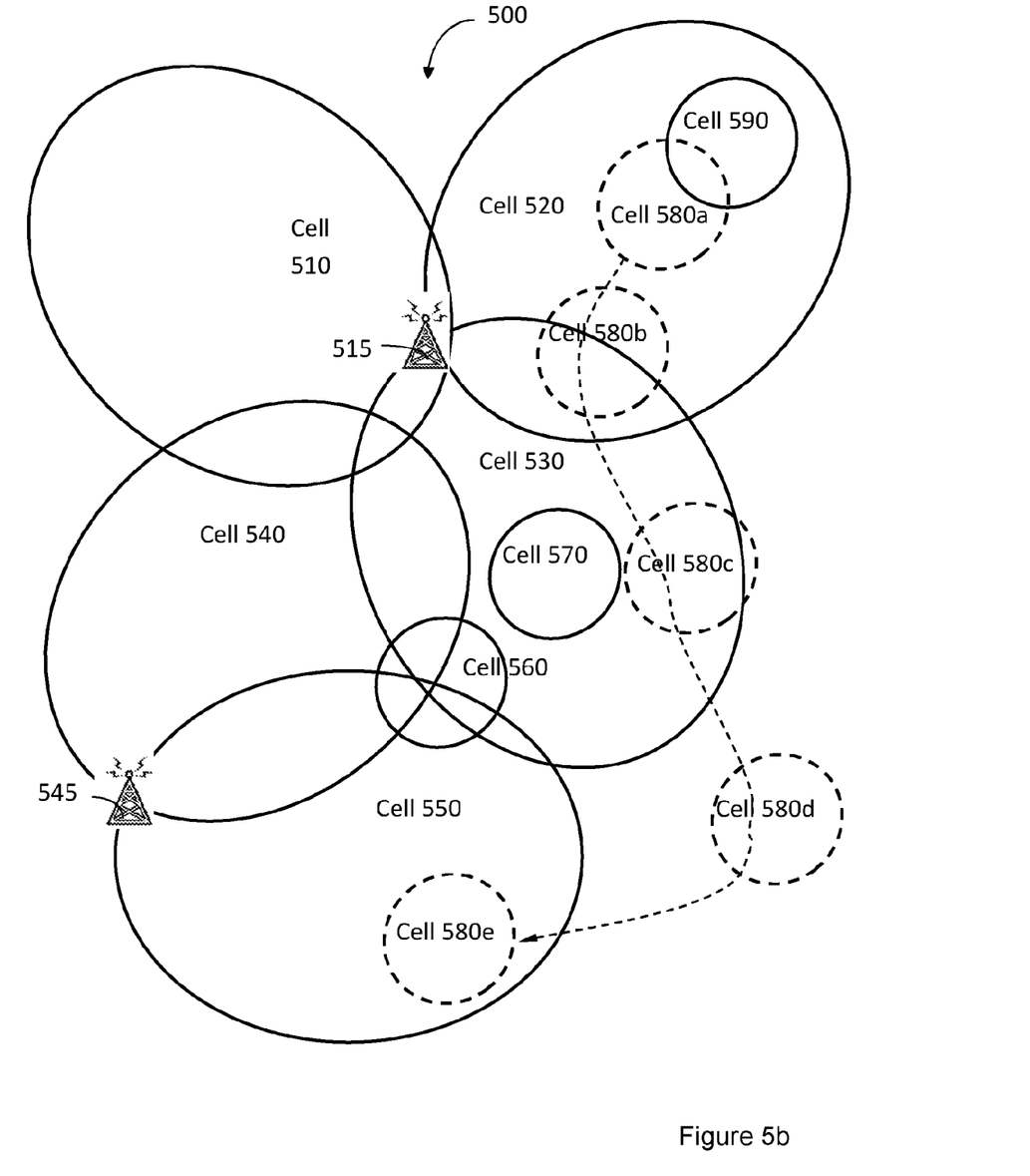

FIG. 5b discloses the same cell pattern, wherein the cell 580 is configured as a moving cell. The physical parts of the radio access node serving cell 580, may be located in some type of vehicle. In a first position, illustrated as cell 580a, the cell 580a is a neighbor to cells 590 and 520. Moving to a second position, the cell 580b neighbors cell 530, but is no longer a neighbor to cell 590. Moving into the new position, the cell 580b, determines that there is a need for neighbor cell list update, as previously discussed with relation to FIG. 4. A neighbor cell list is generated for the moving cell in the position 580b, whereupon the neighbor cell list of cell 530 may be updated as soon as it has been concluded that this is a new neighbor cell relation for the moving cell in position 580b. Information is then submitted to the serving radio access node on the updated neighbor cell lists for the two cells 530, 580. Exiting position 580a, the cell may still be listed in the neighbor cell list of 590. The consequence of this is that a mobile in cell 590 investigating the possibility for hand-over to neighboring cell 580a according to the neighbor cell list will be unable to find the cell. In an embodiment of the invention, a moving cell leaving an area may inform neighboring cells on the expiry of the neighboring relations to avoid the crowding of neighbor cell lists with cells that no longer should be a part of this list. In a third position, is illustrated as cell 580c, the cell 580c is no longer a neighbor to cell 520. As previously discussed with regard to the neighbor relation between cell 580a and cell 590, cell 580a could still be listed in the neighbor cell list of cell 520, but in an embodiment of the invention information could also be sent when exiting from a position having a set of neighbor cell relations. Expiry of a neighboring cell from the neighbor cell list of cell 520, does not have to be performed urgently, but may be required as part of a regular expiry of depreciated neighbors that have not been active during a specified period of time. In the position illustrated as cell 580d, the cell has no neighboring relations at all. Such a situation could occur for any type of vehicle moving outside a coverage area of a cellular network, whilst still offering coverage to passengers of the vehicle. Moving on to the position illustrated as cell 580e, the moving cell 580e detects one neighboring relation to cell 550. The neighbor cell list for the cell 580e, is updated as described in connection to FIG. 4. Based on the neighbor cell list for cell 580e, the cell 580e is introduced as a neighboring cell in the neighbor cell list of cell 550. The updated neighbor cell lists for cell 550 and cell 580e, are submitted to the radio access node 545.

Figure 5C:
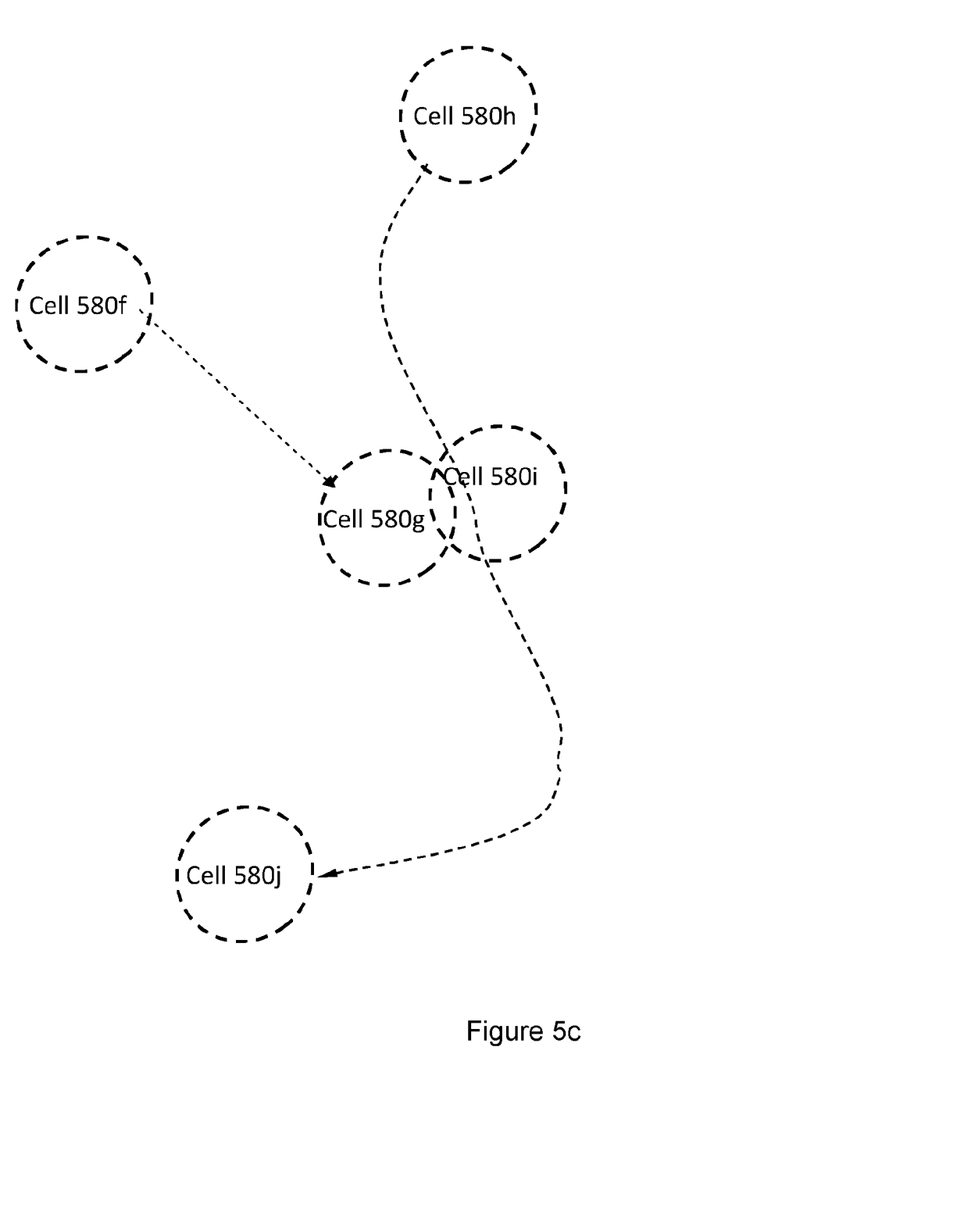

FIG. 5c, illustrates a moving cell pattern with two moving cells. The two cells 580f and 580h have a first position at a substantial distance from one another, thus not having a neighbor cell relation to one another. In a second position, illustrated as cell 580g, and cell 580i, the cells are partly overlapping, thus having neighboring relations to one another. Each of the moving cells will perform an update of the cell specific neighbor cell list as previously discussed for FIG. 4, whereupon updating of the neighbor cell lists of neighboring cells will be performed. In a third position, illustrated as cell 580j, the neighbor cell relation from the second position has been abandoned. The two cells may still include information in the respective neighbor cell list on the previous neighbor cell relation, but removal of the information in a neighbor cell list may also be initiated by the cell moving out of a neighbor cell relation.

Figure 6:
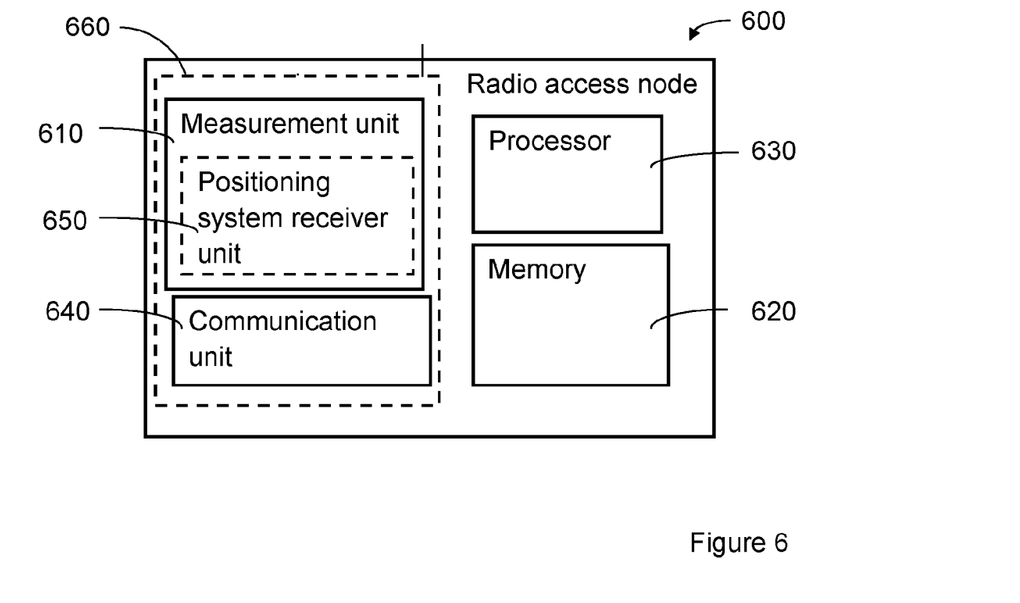

FIG. 6 illustrates a radio access node 600 which contributes in the performance of embodiments of the method for incorporating a moving cell in a hierarchy of cells in a wireless cellular communication network. The node may include a user equipment 660, which may be implemented as a dedicated unit, but may also be part of or emulated by hardware/software in other parts of the radio access node 600. The radio access node comprises a measurement unit 610 configured to perform neighboring cell measurements in the radio access node, e.g, to find the cell identity and/or signal strength. The measurement unit may be part of a user equipment 660 located in the radio access node of the moving cell for the purpose of reporting. The measurement unit may also be a program in a processor 630 that derives parameters like neighbor cell identity and estimated strength from searching/calculating values for the location in a geographical database stored in or fetched to a memory 620. There is also one or more radio units 615, under control of a processor 630 with dedicated radio transmitter and receiver properties for defining cells 320a,b. The radio access node further includes a memory 620 including a neighbor cell list and a processor 630 configured to process the neighboring cell measurements, to identify one or more neighboring cell and to update the neighbor cell list in the memory. A communication unit 640 is configured to send the neighbor cell list or updates of a neighbor cell list to a server including neighbor cell lists for each cell in the wireless communications network. This communication unit could be part of the user equipment 660, but could also be any other type of suitable communication unit enabling communication of the neighbor cell list to the management system 350 disclosed in FIG. 3. The communication unit is also configured to receive information relating to updated neighbor cell lists from e.g. a management system 350 storing a compilation of neighboring cell lists. The measurement unit 610 may also include a positioning system receiver unit 650 configured to determine a geographic position of the radio access node. Reporting from the radio access node on new neighboring relations, may be performed by means of an SMS or data transfer from the user equipment 660. In an embodiment of the invention, the positioning system receiver unit 650 retrieves a position for the moving radio access node from a global positioning system such as the GPS, Galileo or Glonass System. In other embodiments, the position may be retrieved in the measurement unit 610 relative to the neighbor cells and may not be described as a geographical position but rather as a relation to surrounding cells or their serving radio access node.

Figure 7:
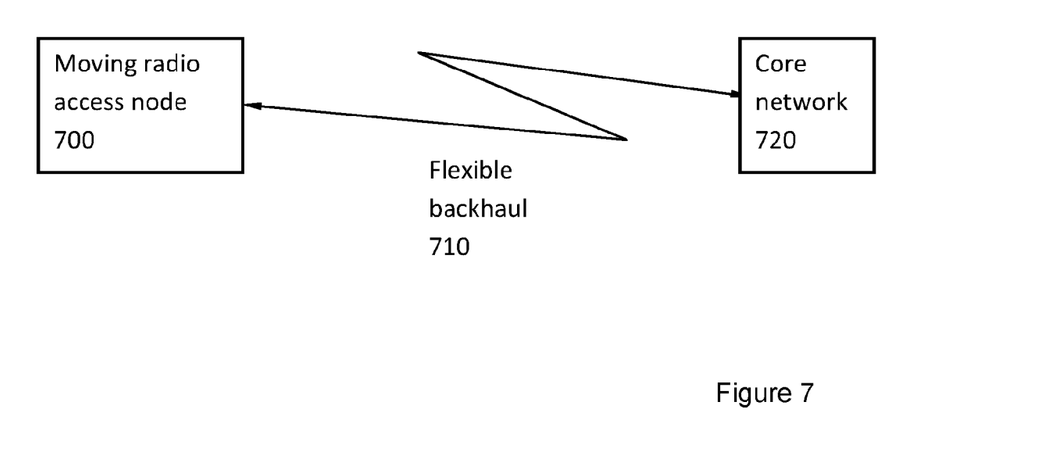

FIG. 7 illustrates the data link 710 between a moving radio access node 700 and the core network 720, also known as the backhaul. Since the radio access node 700 is moving, the backhaul 710 has to be flexible. A typical embodiment is a wireless backhaul using another radio access node or a microwave link. However, wired embodiments are also possible, where a moving radio access node may unplug from one location and plug into another network connection at a new location.

The invention provides for moving radio access nodes that may be carried by vehicles or other moving objects, while being incorporated in a surrounding fixed network. The radio access node of a moving cell is able to create new neighbor relations in real-time and does not need to wait for UEs to find the new cell and report according to traditional mechanisms that may be fast, but does not have real-time performance. Thus, it will be possible to add coverage that follows a crowd or passengers with full handover support to the surrounding network.

The invention is not limited to a particular standard wireless cellular communication networks, but may be carried out in an LTE, WCDMA, GSM/GPRS, Wimax or any other similar wireless cellular communications network.

The above description provides details on a number of possible embodiments of the invention that are non-limiting to the invention. The embodiments serve as illustration of some of the presently preferred embodiments of the invention, but does not determine or limit the scope of the invention. The scope of the present invention also encompasses other embodiments which may become obvious to those skilled in the art, and the scope of the present invention is not to be limited by anything but the appended claims.

The invention claimed is:

1. A method of incorporating a moving cell in a hierarchy of cells in a wireless cellular communication network, wherein each cell is served by a radio access node and is associated with a neighbor cell list comprising identification of one or more neighboring cells, the method comprising:
    determining a need for an update of one or more neighbor cell lists based on a relocation of the moving cell from a first location having a first set of neighboring cells to a second location having a second set of neighboring cells, wherein determining the need for the update includes retrieving from a global positioning system, a position for the moving cell and comparing the moving cell position with known positions of neighboring cells;
    generating a neighbor cell list for the moving cell including identification of each cell in the second set of neighboring cells;
    updating a neighbor cell list for each cell in the second set of neighboring cells to include the moving cell; and
    informing each radio access node serving one or more cells in the second set of neighboring cells on the updated neighbor cell list.

2. The method according to claim 1, wherein generating the neighbor cell list for the moving cell is performed based on at least one user equipment reporting.

3. The method according to claim 1, wherein the second set of neighboring cells includes cells that have an overlapping coverage area with the moving cell.

4. The method according to claim 1, wherein updating the neighbor cell list for each cell in the second set of neighboring cells includes sending data on the moving cell identity to one or more entities responsible for updating neighbor cell list content.

5. The method according to claim 1, wherein updating the neighbor cell list for each cell in the second set of neighboring cells further includes compiling the neighbor cell lists in a neighbor cell list database and storing the neighbor cell list database in a physical or virtual server.

6. The method according to claim 1, wherein informing a radio access node serving a respective cell on the updated neighbor cell list includes propagating a copy of at least each updated neighbor cell list to the radio access node serving the respective cell and storing the copy in the radio access nodes.

7. The method according to claim 1, wherein informing a radio access node serving a respective cell on the updated neighbor cell list includes ordering each radio access node in the second set of neighboring cells to retrieve a copy of a respective neighbor cell list from a neighbor cell list data base.

8. The method according to claim 1, wherein the neighbor cell list for the moving cell is generated within a predetermined first time period from the relocation of the moving cell.

9. The method according to claim 1, wherein an information regarding content of the neighbor cell lists is communicated to the second set of neighboring cells within a predetermined second time period following generating the neighbor cell list for the moving cell.

10. A radio access node serving a moving cell in a hierarchy of cells in a wireless cellular communication network, comprising:

a measurement unit performing neighboring cell measurements;

the measurement unit retrieving a position for the moving cell from a global positioning system;

a memory including a neighbor cell list of one or more cell(s) neighboring the moving cell;

a processor determining a need for an update of the neighbor cell list based on relocation of the moving cell from a first location having a first set of neighboring cells to a second location having a second set of neighboring cells and updating the neighbor cell list in the memory, wherein determining the need for the update includes comparing the moving cell position with known positions of neighboring cells; and a transceiver sending the updated neighbor cell list to a server including neighbor cell lists for each cell in the wireless cellular communications network.

* * * * *